Jan. 27, 1931.   R. T. FLORA   1,790,232
PHOTOGRAPHIC APPARATUS
Filed March 21, 1927   3 Sheets-Sheet 1
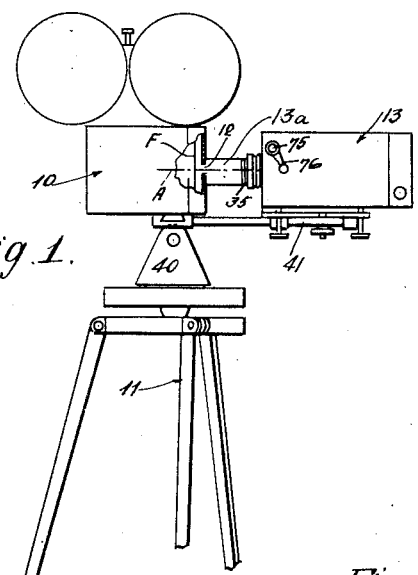
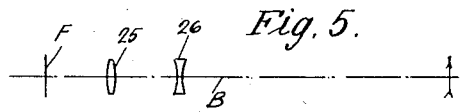
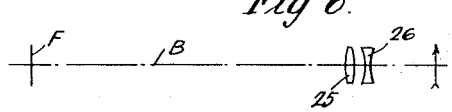
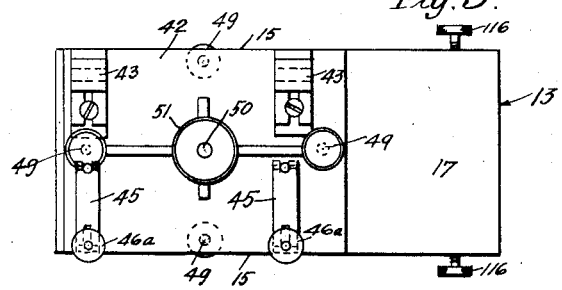
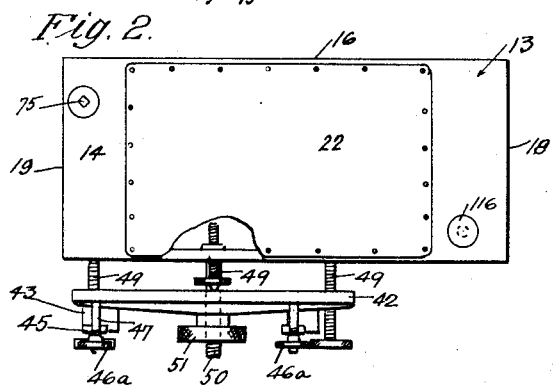
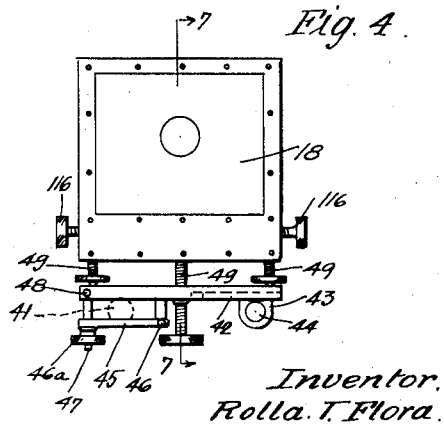
Inventor,
Rolla. T. Flora.
Attorney.

Jan. 27, 1931.   R. T. FLORA   1,790,232
PHOTOGRAPHIC APPARATUS
Filed March 21, 1927   3 Sheets-Sheet 2

Inventor
Rolla T. Flora.
Attorney.

Jan. 27, 1931.  R. T. FLORA  1,790,232
PHOTOGRAPHIC APPARATUS
Filed March 21, 1927  3 Sheets-Sheet 3
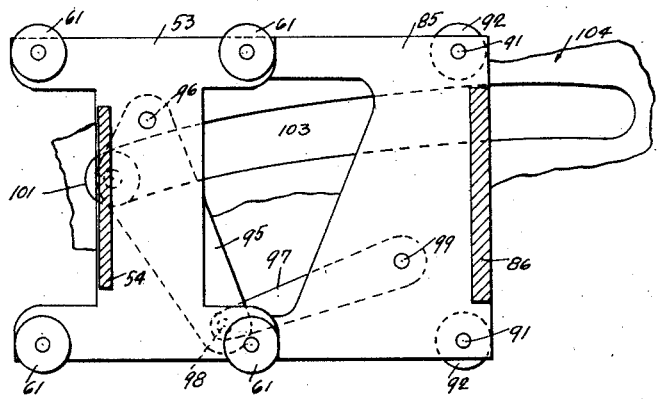
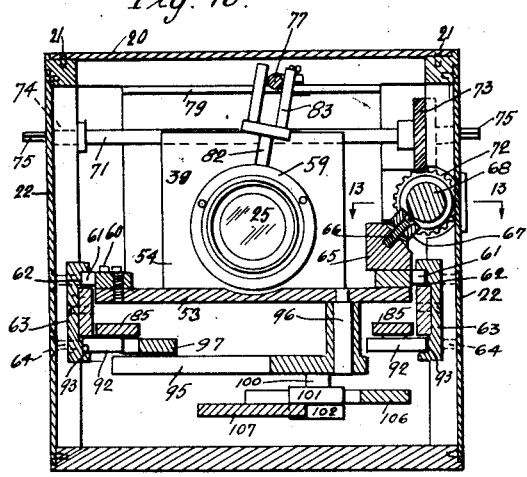
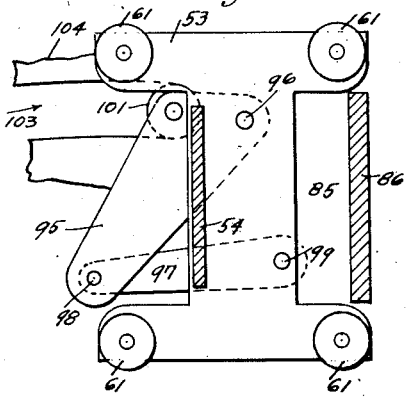
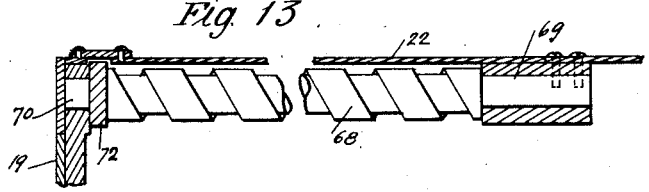
Inventor
Rolla. T. Flora.
Attorney.

Patented Jan. 27, 1931

1,790,232

UNITED STATES PATENT OFFICE

ROLLA T. FLORA, OF LANKERSHIM, CALIFORNIA, ASSIGNOR, BY MESNE ASSIGNMENTS, TO PARAMOUNT PUBLIX CORPORATION, A CORPORATION OF NEW YORK

PHOTOGRAPHIC APPARATUS

Application filed March 21, 1927. Serial No. 176,904.

This invention has to do generally with photographic apparatus and is more particularly concerned with motion-picture-taking apparatus.

The general object of the invention may be considered the provision of picture-taking means having a movable lens system controllable by a single operation to have relatively short-focal, telephoto or any intermediate focal characteristics with respect to a given focal plane. This may be expressed otherwise as the provision of a lens system operatively associated with photographic apparatus adapted to support a light sensitive element in a given plane, and movable in a manner varying its focal length to vary the linear dimensions of a given image projected by the lens system on the element while constantly maintaining said image focused on said element. This is accomplished generally by the provision of a pair of lenses movable with relation to each other to vary the resultant focal length and movable together to and from the focal plane in a movement which is a function of the distance between them.

I will not attempt to discuss exhaustively the utility of such a device, nor the many situations in which it may be used to advantage. However, I will describe one or two typical situations in order that a clear understanding may be had of the general character of its use. Assume, for instance, that it be desired to take a relatively "long shot" of a landscape and then take a close-up of some detail thereof. The usual method of accomplishing this would involve either two camera settings, one for the long shot and the other for the close-up, or else the mounting of the camera on a car which is advanced toward the object while the cameraman constantly changes his focus to agree with the variable distance therefrom. Both of these operations call for laborius preparations and are necessarily costly.

In contradistinction to this, the same situation may be handled by my device with but a single setting of the camera. The camera is set up to take the long shot and while the film is being exposed the lenses are moved as described above to cause the gradual magnification or increase of linear dimensions of the image on the film, thus giving the effect of a gradual change from a long shot to a close-up. Or, of course, the long shot may be made and then exposure of the film stopped until the lenses have been moved to such a position that the image on the film will be magnified to a predetermined degree.

The effect gained by gradually merging a long shot into a close-up, or vice-versa, is greatly superior to that gained by an abrupt change from one to the other, as is well recognized, and my apparatus is especially well fitted to carry out this effect. Furthermore, there are many situations where it is impossible to use the usual method of making "approach" or receding shots which may be handled most advantageously by my apparatus. For instance, assume that the terrain in front of the object to be photographed is of such a nature as to prevent near approach by the camera. It would then be impossible to gain the desired effect by either of the usual methods. On the other hand, my device enables the set-up of the camera at the edge of the inaccessible terrain, and then, by moving the lenses, the effect of approach or recession may be simulated, or a long shot may be followed by a close-up of some detail.

The structure of the attachment portion of my apparatus is of a nature to be applied readily to standard cameras, and the nature and arrangement of the moving parts are such that the movement of the lens system in no way interferes with the proper exposure of the film within the camera.

There are other objects and novel features of the invention, but these may be made apparent and discussed to better advantage in the following detailed specification, reference being had to the accompanying drawings, in which:

Fig. 1 shows my attachment applied to a conventionally illustrated camera;

Fig. 2 is an enlarged side elevation of my attachment;

Fig. 3 is a plan view of Fig. 2, looking from beneath;

Fig. 4 is an end elevation of Fig. 2, looking from the right thereof;

Figs. 5 and 6 are diagrammatic views illustrating the general characteristics of the lens system;

Fig. 10 is a section on the broken line 10—10 of Fig. 8;

Fig. 11 is a plan view looking from the position of line 11—11 of Fig. 7 but showing the lens carriers or mountings in different positions;

Fig. 12 is a view similar to Fig. 11 but showing the carriers in still other positions; and Fig. 13 is a contracted section, partly in elevation, on line 13—13 of Fig. 10.

Figure 8:
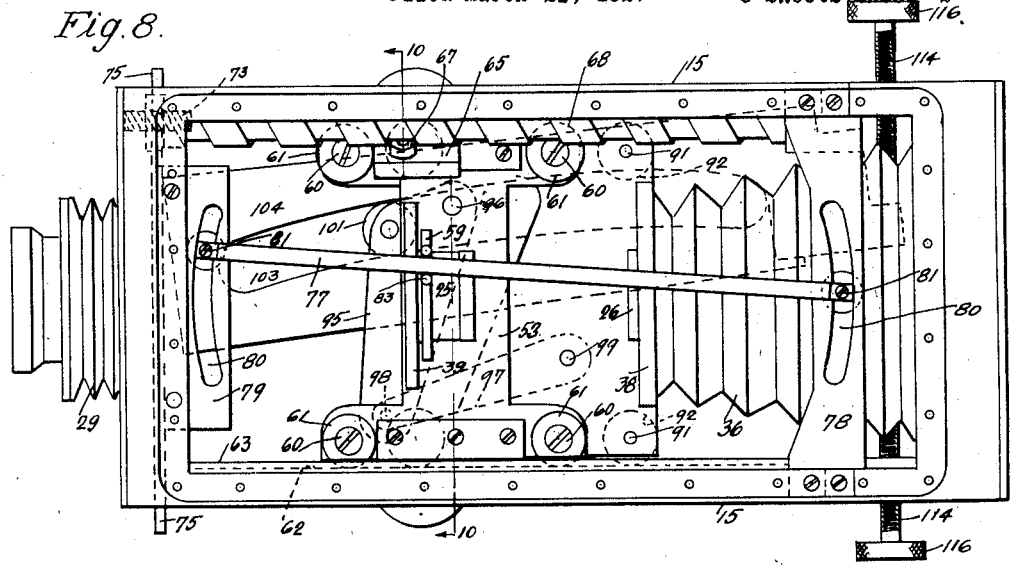
Fig. 8 is a top plan view of Fig. 7, showing the cover plate removed.
Figure 7:
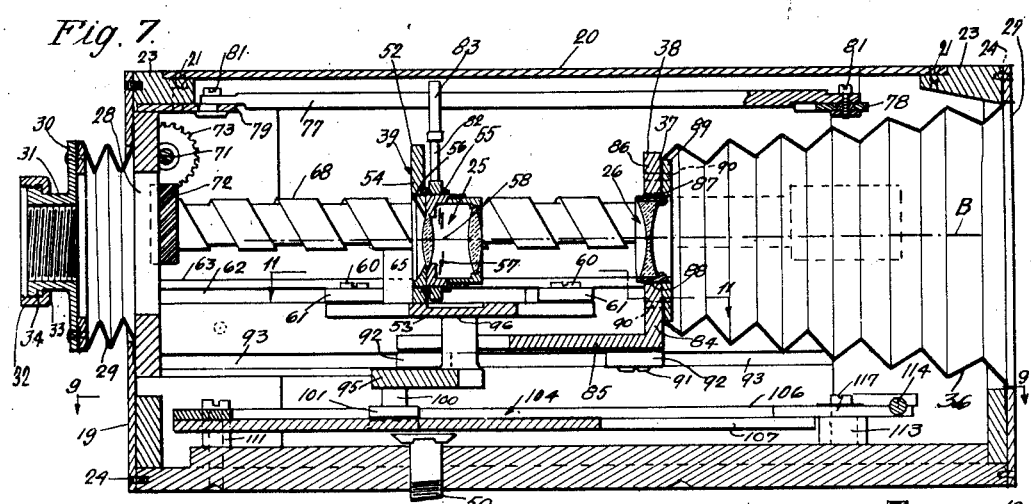
Fig. 7 is an enlarged section on line 7—7 of Fig. 4.
Figure 9:
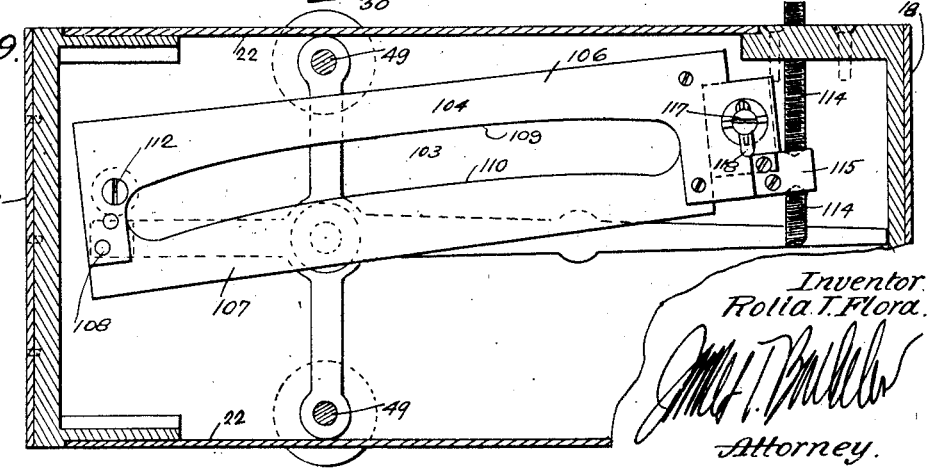
Fig. 9 is a section on line 9—9 of Fig. 7.

In Fig. 1 I have conventionally indicated a usual motion picture camera at 10 mounted upon tripod 11, said camera having a usual light-sensitive element or film F supported in a given plane behind photographic aperture 12. When my attachment, generally indicated at 13, is to be applied to the camera, the usual lens system is removed from in front of aperture 12 and a light-tight connection made between the interior of attachment 13 and the tube 13ª, which latter is a conventional showing of the usual element carried by cameras for holding the lens system in axial alinement with aperture 12 and film F.

Attachment 13 includes a rectangular housing 14 consisting of sides 15, top 16, bottom 17, forward end 18 and rearward end 19. While this is not essential to the invention, it is preferable that the various walls or sections thereof be removable in order that access may be had to the mechanism for inspection or adjustment. For instance, cover plate 20 may be removed, after the withdrawal of screws 21, to permit access to the mechanisms from above, while removable side plates 22 give access to the mechanism from the sides. Ends 18 and 19 are preferably in the form of plates removably held to corner members 23 by screws 24. The joints between the various housing walls and cover plates are of a nature to be light-tight.

The lens system within the housing is made up of a pair of axially alined lenses generally indicated at 25 and 26, the nature of which will be explained later, and end plates 18 and 19 have apertures 27 and 28, respectively, in alinement with the axis B of the lens system. Anchored to and extending outwardly from end plate 19 is an expansible joint or bellows 29, the free end of which is clamped to flange 30 of tube 31. Said tube is adapted to be coupled to tube 13ª, or its equivalent, by any suitable means. For instance, a union sleeve 32, having an annular flange 33 adapted to engage tube flange 34, may be threaded into connection with tube 13ª at 35.

Extending inwardly from end plate 18 and marginally about aperture 27, is an expansible joint or bellows 36, the free, inner end of which is clamped at 37 marginally about lens 26 to its mounting or carrier 38, the mounting or carrier for the other lens 25 being indicated generally at 39. With the attachment applied to the camera, it will be seen that axis B is in line with the axis A of the camera aperture and therefore in line with film F, it following that film F will be exposed to objects presented in front of aperture 27. Hence, when attachment 13 is applied to the camera aperture 27 may be considered as the exposure aperture of the photographic apparatus. The expansible joints between the housing and tube 31 and mounting 38 are such that no stray light is admitted to the interior of the housing.

Attachment A is supported from the tripod in any desirable manner. I have shown a preferred mounting and will describe it with some detail, but it will be understood this is not in any way to be considered as limitative on the invention viewed in its broader aspects. Extending horizontally from tripod head 40 and in substantial parallelism with axis A are the spaced guide rods 41. A base plate 42 is provided with a depending lug 43 having a horizontal bore 44 adapted to take one of the rods 41 with sliding fit. A pair of clamping bars 45 are arranged near the forward and rear end of plate 42 at the side opposite lug 43. These bars are adapted to be swung about horizontal axes 46 into clamping engagement with the other guide rod by actuation of knurled nuts 46ª which are threaded on rod 47, the latter swinging below the plate from pivot pins 48.

Housing 14 is supported in spaced relation above plate 42 by leveling screws 49, preferably arranged one in each corner and one midway of each side of the housing in order that the latter may be finely and accurately adjusted as to level. A clamp bolt 50 extends through the bottom wall of the housing and through base plate 42, the bolt taking hand nut 51 beneath said base plate whereby the plate and housing are detachably held in assembly and whereby the housing is adapted to be clamped rigidly with respect to the base plate after the leveling screws have been properly adjusted.

By virtue of the above described mounting, the attachment may be readily applied to rods 41 and slipped endwise with relation thereto into position for connection with the camera at 35. Actuation of the leveling screws serves to bring the lens system of the attachment into proper alinement with film F, and the flexible joint provided by bellows 28 allows for limited movement of the housing in the direction of axis B in order that initial focusing may be accomplished in the manner to be described.

As noted above, lenses 25 and 26 have individual, movable carriers or mountings 39 and 38, respectively, and I will now proceed to a description of these carriers though it will be understood the invention, considered in its broader aspects, is not limited to these particularities of construction, for the lens mountings and provision for moving them may differ appreciably from the instant showing without departing from the spirit and scope of the broader claims appended hereto.

Carrier 39 consists of a supporting or angular body member 52 having a horizontal plate portion 53 and a vertical plate portion 54, the latter supporting the mount 55 for lens 25 through any suitable connection such as the threaded one shown at 56. The lens mount may be of any suitable character, and I have here shown in connection therewith a conventionally indicated diaphragm 57 which is arranged with its aperture 58 coaxial with the lens. Since diaphragm construction is very well understood by those skilled in the art, it is believed this conventional showing will suffice, it being noted, however, that said diaphragm is of a nature to be operated to vary the diameter of its aperture. It will be considered that the diaphragm is operable to accomplish the variable opening and thereby very the diameter of the pencil of light admitted through the lens system, by means of a usual slip collar 59 which is mounted on and adapted to be rotated with respect to tubular mount 55. The connection between the diaphragm leaves and ring 59 is not shown since the connection may be of any of the well known types, and a showing of which would tend to confuse the drawings. The means for operating the diaphragm for varying its aperture will be described presently.

Mounted for rotation about the plate-supported shafts 60 are rollers 61, these rollers being preferably four in number and arranged one at each corner of the T-shaped plate 53. The rollers extend beyond the sides of the plate into ways 62 provided in bars 63, the latter extending along and being secured at 64 to the side walls of the housing or any suitably associated part of the stationary structure. Ways 62 extend longitudinally in parallelism with axis B, it following that mounting or carrier 39 is supported for rolling movement in the direction of said axis toward and away from aperture 27 or aperture 28.

A supporting block 65 is secured to and extended upwardly from plate 53, this block carrying an angularly arranged stud 66 about which a roller 67 is adapted to rotate, this roller, in effect, providing an anti-friction cam member which extends into spiral engagement with lead screw 68, whereby rotation of said screw acts on the stud in a manner to move the carriage or carrier 39 to and fro through the housing. Lead screw 68 is journaled on the housing structure as at 69 and 70 (Fig. 13) and is adapted to be rotated by drive shaft 71 with which it has spiral gear connection at 72, 73. Drive shaft 71 is journaled in the side walls of the housing as at 74, and extends outwardly beyond said side walls, terminating in extensions 75 which are preferably squared to take a usual operating handle 76 (Figs. 1 and 10).

I provide means acting automatically during the to and fro movement of the lens carrier to operate the diaphragm in the manner described above. For this purpose there is arranged a cam rod 77 above carrier 39, this rod being given its cam characteristics by virtue of being arranged angularly with respect to axis A or the direction of carrier-movement. A convenient adjustable mounting for this cam rod is provided through end supports 78, 79, said supports being in the nature of plates extending across the housing from side to side and provided with arcuate slots 80 to take releasable clamping bolts 81 which extend through the terminals of the rods. By loosening one or the other of the clamping screws 81, the rod may be shifted circumferentially about the other bolt, or by loosening both clamping bolts the rod may be shifted bodily.

Extending radially from diaphragm control ring 59 is a rod 82 having an upwardly opening fork 83 at its upper end, the latter being adapted to take cam rod 77 between its arms. It will be evident that with rod 77 arranged angularly with respect to the direction of carrier movement, relative movement between rod 77 and the carrier serves to rotate ring 59 with relation to mount 55 in a manner to operate the diaphragm for opening or stopping down its aperture. Since the cam rod 77 is adjustable as to angularity and as to its position cross-wise of the housing, it follows that it may be adjusted to vary the extent and speed of diaphragm operation during given extents of carrier movement or to vary the relative direction of rotation of collar 59 when the carrier is moving in a given direction. The adjustment also provides means whereby the diaphragm may be set with its aperture at predetermined diameter with the carrier in a given position along its path of movement. Ordinarily, of course, the setting is such that the diaphragm opens as the lens system moves toward aperture 27 and close as it move away from said aperture.

Carrier 38 embodies an angular supporting member 84, the horizontal plate portion 85 thereof being supported in a plane below plate 53 and adapted, at certain times, to move thereunder. Vertical portion 86 of member 84 carries the mount 87 for lens 26, the connection between carrier and mount being of any suitable character such as screw threads 88. As mentioned heretofore, the inner end of bellows or expansible joint 36 is clamped to member 86, the clamping being shown here as being accomplished through ring plate 89 detachably secured to portion 84 by screws 90.

Supported on shafts 91 which are secured to and depend from plate 85, are rollers 92, said rollers preferably being four in number and arranged one at each corner of the plate. The rollers extend into ways 93 provided at opposite sides of the housing in bars 63 and extending in parallelism with ways 62. It follows that the carrier 38 and its lens are movable longitudinally through the housing toward or away from apertures 27, 28 to carry lens 26 along axis B. This movement is, of course, limited, the bellows 36, however, being of sufficient effective length to permit such movement of the carrier from one extreme position to the other.

I have heretofore set out the means for moving lens 25 longitudinally through the housing and I will now proceed to a description of the general character of movement given to lens 26 and to the two lenses together. This movement is of such a nature that with the lenses having given characteristics, they are movable in a manner to vary the focal length of the lens system and thereby vary the linear dimensions of a given image projected by the lens system on film F while constantly maintaining said image focused on the plane. This movement may be described as that of the pair of lenses with relation to each other to vary the resultant local length and of the lens-pair or lens system, as a whole, to and from the focal plane (film F) in a movement which is a function of the distance between them.

It will be seen that the precise character of movement depends upon the particular characteristics of the given lenses. I have here indicated lenses of the following description. The minus 26 is approximately one inch in diameter and has a focal length of three inches. The plus lens combination 25 has a focal length of three inches and its effective opening is in the proportion of $f3.5$. The proportionate sizes of the lenses shown in the drawings are approximately those given just above. Of course, those skilled in the art, will readily recognize that the specified results may be gained with lenses having characteristics other than those given above, the single example being given merely as illustrative.

With the lenses having the above characteristics, the carrier moving means here shown is adapted to move the lens system in a manner to give the results specified above. However, it will be distinctly understood that my invention broadly contemplates lenses of widely varying characteristics and hence any means for moving such lenses to gain the described results.

While the movement of the forward lens 26 may be accomplished in any manner to give substantially the results specified, it is preferable, of course, that it be driven by virtue of rotation of shaft 71 in order that synchronism between the lens carriers may be positively assured and in order to reduce mechanical complications. For the same reason it is desirable, though not limitative on my invention, to apply the drive connection to the forward carrier from the rearward carrier.

In the present instance this drive connection from carrier 39 to carrier 38 is of the following nature. This drive connection is accomplished through a lever or arm 95 pivoted at 96 to and beneath plate 53 for horizontal, oscillatory movement. A link 97 has pivotal connection at its opposite ends with arm 95 and the plate 85 of carrier 38, this point of pivotal connection being indicated at 98 and 99, respectively. Arm 95 carries near pivot point 96 a depending shaft 100, there being a pair of superposed rollers 101 and 102 mounted for independent rotation thereabout, these two rollers forming, in effect, a single cam projection or roller adapted to engage operatively the cam slot 103 in the cam plate generally indicated at 104.

For the time being, cam plate 104 may be considered as held stationarily to the bottom of the housing, and in its coaction with rollers 101, 102, it is of a nature to give crank characteristics to arm 95. That is, as carrier 39 is moved longitudinally through the housing, the rollers engage the cam in such a manner that lever 95 is controlled in its oscillatory movement.

With the lenses having the characteristics above set forth, the proportions of the arm and link and their points of application to the carriers are such that with the cam rollers travelling through slot 103, the lens carriers are given such movement relative to each other and, considered as a pair, with relation to the film F, that the lens system, as a whole, has the variable focal characteristics set forth above. In this particular instance, the leverages, points of application, and cam characteristics are such that as the lens-pair moves from the position of Fig. 5, to that of Fig. 6, the individual lenses move together through the major portion of their travel, though at certain times they may have no relative movment and at other times during the forward travel of the pair there may be periods during which the lenses have slight separative movements. As the lenses move from the position of Fig. 6 to Fig. 5 reverse action occurs.

Cam plate 104 is preferably, though not necessarily, made up of pair of horizontally overlapping plates 106 and 107 held together at 108. Section 106 has a cam face 109 against which roller 101 is adapted to bear, while section 107 has cam face 110 against which the lower roller 102 bears. The cam faces 109 and 110 merge into one another at their ends, and together, may be considered as defining cam slot 103. The described structure of the cam plate is one which permits of relatively easy, accurate manufacture, and has a further advantageous feature, in that it allows for relatively opposite rotation of the cam rollers while the carriers are moving in a given direction, there thus being no tendency to check the advancing rotation of the rollers as would be the case were a given roller to be in peripheral contact at diametrically opposite sides with the defining walls of a cam slot.

Plate 104 is pivotally supported at one end on a post 111 which extends upwardly from the bottom of the housing, the pivotal connection being indicated at 112. The free end of the plate is adapted to slide horizontally over the bottom post 113, adjusting screw 114 extending threadably through the side walls of the housing and into terminal engagement with the plate projection 115 to provide means whereby the cam plate may be swung about point 112 into adjusted position, adjusting bolts 114 having hand nuts 116 on their outer ends whereby they may be manipulated. This adjustment serves to regulate the throw imparted to arm 95, within certain limits, and thereby is adapted to vary somewhat the relative movement of the individual lenses. A clamping screw 117 is passed downwardly through arcuate slot 118 in plate 104 and into block or post 113. This slot limits the extent of horizontal pivotal movement of cam 104, and screw 117 may be threaded down to clamp said plate in adjusted position.

In using my apparatus, the camera and attachment 13 are first connected to one another in the manner described above, both being carefully leveled and brought into proper alinement. With clamps 45 released, attachment 13 is bodily moved longitudinally along rods 41, to bring the system into initial focus on a given object to be photographed. This may be done irrespective of the relative condition of the lens system, and the limited bodily movement is allowed by virtue of the expansible nature of bellows 29. With the system thus focused, clamps 46 are tightened down to hold the attachment rigidly in proper association with the camera.

Then, with this single camera and attachment setting, shaft 71 may be rotated through crank 76 in a manner to move the lenses as described, and to the advantageous ends set forth above. It will also be understood there are many situations other than those described in which the apparatus may be used to considerable advantage. Such situations will be made apparent to those skilled in the art from the understanding given above of the general principles of construction and operation.

It will be understood the drawings and description are to be considered merely as illustrative of and not restrictive on the broader claims appended hereto, for various changes in design, structure and arrangement may be made without departing from the spirit and scope of said claims.

I claim:

1. In a device of the character described, a housing having an exposure aperture, a pair of lenses within the housing, individual mountings for the lenses and mounted for movement to carry said lenses along their common axis towards and away from the aperture, means for moving one of the mountings, and a drive connection between said one mounting and the other mounting whereby the other mounting is adapted to be moved by movement of the one; said drive connection embodying an oscillatory arm on one of the mountings, a link connecting the arm and other mounting, and means for controlling the oscillatory movement of the arm as the one mounting is moved with relation to the housing.

2. In a device of the character described, a housing having an exposure aperture, a pair of lenses within the housing, individual mountings for the lenses and mounted for movement to carry said lenses along their common axis towards and away from the aperture, means for moving one of the mountings, and a drive connection between said one mounting and the other mounting whereby the other mounting is adapted to be moved by movement of the one; said drive connection embodying an oscillatory arm on one of the mountings, a link connecting the arm and other mounting, and adjustable means for controlling the oscillatory movement of the arm as the one mounting is moved with relation to the housing.

3. In a device of the character described, a housing having an exposure aperture, a pair of lenses within the housing, individual mountings for the lenses and mounted for movement to carry said lenses along their common axis towards and away from the aperture, means for moving one of the mountings, and a drive connection between said one mounting and the other mounting whereby the other mounting is adapted to be moved by the movement of the one; said drive connection embodying an oscillatory arm on one of the mountings, a link connecting the arm and other mounting, a cam in the housing, and a roller on the arm adapted to coact with the cam whereby the arm is controlled in its oscillatory movement as the mounting is moved with relation to the housing.

4. In combination with a camera adapted to support a light-sensitive element in a given plane, a pair of lenses mounted on the camera for movement together along an axis to and from said plane and for movement relative to each other along said axis, means for moving the lenses with reference to said plane and to each other to keep their focus on said plane, a diaphragm associated with one of the lenses, and adjustable means acting automatically to close the opening of the diaphragm as its lens is moved toward, and to open said opening as its lens is moved away from said plane.

In witness that I claim the foregoing I have hereunto subscribed my name this 3d day of March, 1927.

ROLLA T. FLORA.